United States Patent
Mistry et al.

(10) Patent No.: US 9,838,866 B2
(45) Date of Patent: Dec. 5, 2017

(54) 4G LTE POWER ON ACTIVATIONS

(71) Applicant: Cellco Partnership, Basking Ridge, NJ (US)

(72) Inventors: Satish B. Mistry, Piscataway, NJ (US); Zhengfang Chen, Milburn, NJ (US); Azam Khan, Franklin Park, NJ (US); Dimitri Kvares, Mount Arlington, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 509 days.

(21) Appl. No.: 14/139,032

(22) Filed: Dec. 23, 2013

(65) Prior Publication Data

US 2015/0181419 A1    Jun. 25, 2015

(51) Int. Cl.
*H04W 8/18* (2009.01)
*G06F 9/445* (2006.01)

(52) U.S. Cl.
CPC ............. *H04W 8/18* (2013.01); *G06F 9/445* (2013.01)

(58) Field of Classification Search
CPC ..... H04W 8/265; H04W 8/245; H04W 4/001; H04W 8/18
USPC .......................................... 455/419; 709/222
See application file for complete search history.

(56) References Cited

U.S. PATENT DOCUMENTS

| | | | | |
|---|---|---|---|---|
| 7,644,270 B1* | 1/2010 | Cherukumudi | ..... | H04L 63/0823 709/206 |
| 8,798,623 B2* | 8/2014 | Yi | ......... | H04W 48/18 455/419 |
| 8,838,087 B1* | 9/2014 | Delker | .............. | H04M 1/72525 455/419 |
| 2002/0107011 A1* | 8/2002 | Mazzarella | ............. | H04M 3/22 455/419 |
| 2009/0181662 A1* | 7/2009 | Fleischman | ........... | H04W 8/245 455/419 |
| 2012/0096162 A1* | 4/2012 | Cecilia Torralba | ... | H04W 4/001 709/225 |
| 2014/0248852 A1* | 9/2014 | Raleigh | ............... | H04M 15/723 455/407 |

* cited by examiner

*Primary Examiner* — Erica Navar
*Assistant Examiner* — Donald H B Braswell (57) ABSTRACT

A customer is permitted to self-activate a mobile device purchased via a commercial sales channel. Upon powering on the mobile device, the mobile device establishes a restricted service session through the network to a self-activation service and the mobile device queries the self-activation service for any pending order related to the mobile device which may have been generated during the purchase process. The communications with the self-activation service, however, support completing the pending order, activating the mobile device and communicating to the user that activation is complete. Part of the activation procedure configures one or more network elements to provide service for the device in a normal unrestricted manner. When provisioning is complete, the restricted access configuration used to establish the session with the self-activation service is removed.

20 Claims, 5 Drawing Sheets

4G LTE POWER ON ACTIVATIONS

BACKGROUND

In recent years, mobile wireless communications have become increasingly popular. Presently, mobile devices such as laptops, personal digital assistants ("PDAs"), smartphones, cell phones, tablet PCs and other portable computers are rapidly gaining popularity. Mobile devices are available with interfaces enabling communications via mobile networks or local area network (LAN) wireless access points (hereinafter "wireless hotspot networks" or "hotspots"). Currently, mobile networks are operational that conform with the fourth generation (4G) Long Term Evolution (LTE) standard. These mobile networks provide voice communication, messaging, email and internet access (for example) by using radio frequency communication. Communications via hotpots may occur using a communications standard such as IEEE 802.11 ("WiFi") network type wireless access points.

The mobile devices with capability of accessing services through a mobile network or through a hotspot network usually are sold at a point of sale (POS) of the mobile network carrier and activated for voice communication and data transfer at the POS at the time of purchase.

Recently, sales channels have diversified such that buyers can buy the mobile devices via websites and markets other than the POS of the mobile network carrier. In these later purchase channels, a buyer purchases only a mobile device via a website or another non-carrier market without buying a data plan to access the mobile network. Therefore the buyer needs to activate the mobile device on the buyer's own by buying the data plan of the mobile network or adding the device to an existing plan (e.g. instead of or in addition to other devices of the user). To facilitate this type of self-activation by a user, the mobile devices thus should have a limited accessibility to only websites or platforms of the appropriate mobile network carrier for activation of the mobile devices. General access via the hotspot or mobile network becomes available only after activation. Existing activation technologies, particularly for devices compatible with 4G LTE mobile networks, have not supported this limited access for self-activation.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples described in detail below relate to a method and a system for permitting a customer to self-activate a mobile device. Upon powering on the mobile device, the mobile device establishes a session with a self-activation service and the mobile device queries the self-activation service for any pending order related to the mobile device. The network is configured to limit access prior to full activation to communications with only the one or more carrier systems supporting the self-activation service. The communications with the self-activation service, however, support completing the pending order, activating the mobile device and communicating to the user that activation is complete. Part of the activation procedure, for example, configures one or more network elements to provide service for the device in a normal unrestricted manner. When provisioning is complete, including the provisioning of the network element(s) for normal unrestricted access, the restricted access configuration used to establish the session with the self-activation service is removed.

For example, a user purchases a mobile device through a website or a POS other than a POS of a mobile network carrier. At the time of purchase, the mobile device is not fully activated for service provided by the mobile network carrier. As part of the mobile device purchase, the user also orders service related to the mobile device. In an example, the service order is for a new postpaid plan, a new line (e.g. device/number) for an existing postpaid plan, an upgrade for an existing device on an existing postpaid plan, or a prepaid plan for initial communication via the cellular network. Although not a unit or equipment of the carrier, the POS or website may be operated by another enterprise having an arrangement with the carrier allowing the enterprise to place orders for service with the carrier and thus having access to enter orders in an appropriate system of the carrier. The website or POS, in this example, initiates the service order related to the mobile device with the mobile network carrier and the mobile network carrier records the pending order related to the mobile device, e.g. in a billing system of the mobile network carrier. After purchase, the user powers on the mobile device and the mobile device establishes a connection with the mobile network carrier, e.g. on a 4G LTE network.

Continuing the example, after establishing the connection with the mobile network carrier, the mobile device queries a self-activation services server of the mobile network carrier and the self-activation services server finds the pending order. The self-activation services server, for example, queries the billing system for any pending orders related to the mobile device. Upon finding the pending order, the self-activation services server, in this example, activates the mobile device and provisions the mobile device and the network.

In general, provisioning is a process for providing data about a mobile device and/or about a network and a user account, so as to associate the mobile device with a network/carrier user account, so the mobile device can connect to the network and operate and obtain services through the network. Such provisioning, for example, may involve entry or modification of account information with the network service provider/carrier to add the mobile device, establish permissions or policies applicable to the device in one or more control elements in the network and/or storing some requisite data (e.g., an identifier assigned by the network operator, control data, etc.) in the mobile device itself.

In the examples, notice of completion of provisioning is provided to the mobile device at the end of activation processing through the self-activation service. In response, the modem or wireless radio of the mobile device is powered off and powered back on, so as to trigger an over the air communication to obtain any data the device may need to program the device itself. Afterward, the mobile device is ready and the network is configured so as to provide regular access to the communication services to which the device user subscribes.

Figure 1:
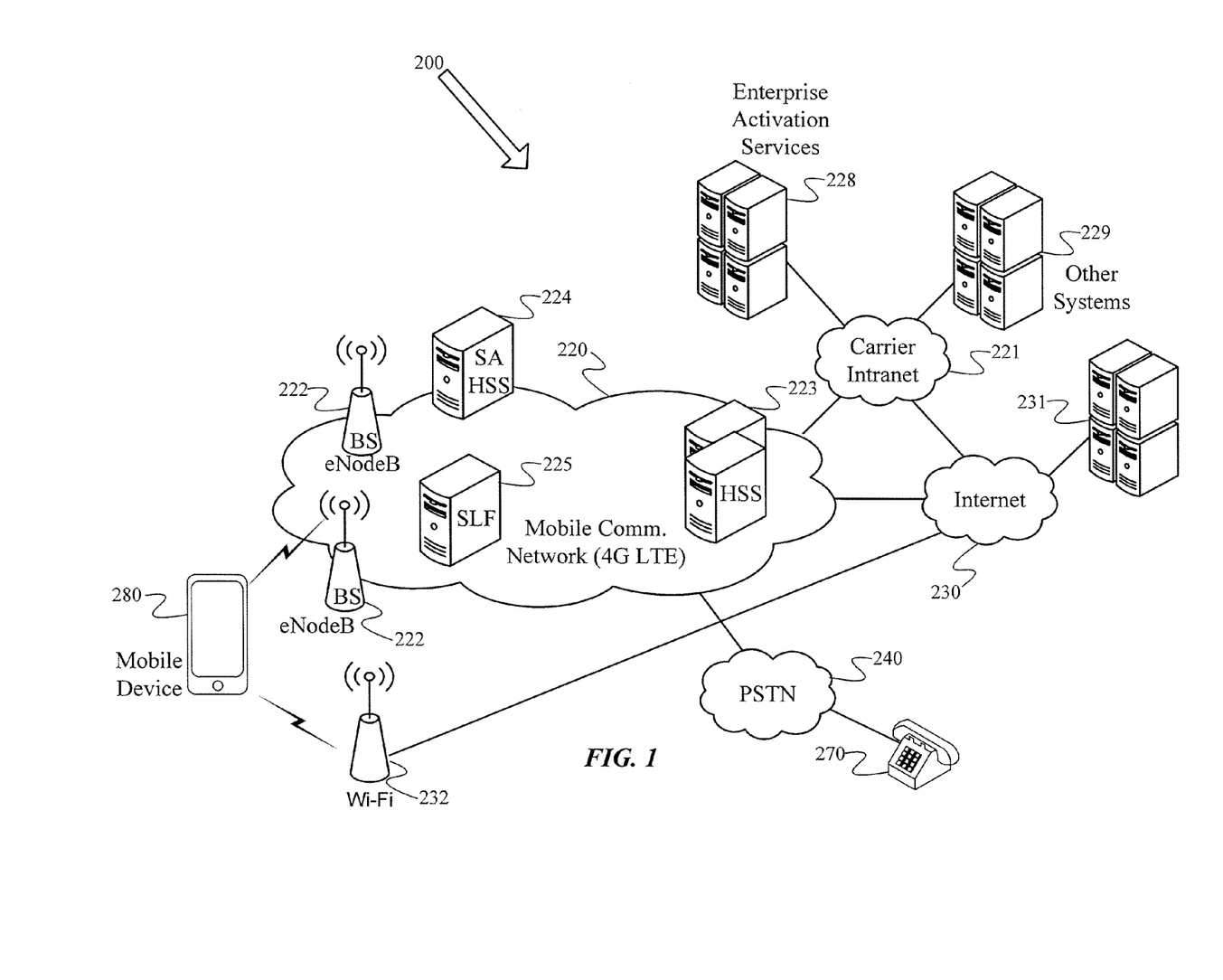
FIG. 1 is a functional block diagram of an exemplary system which may implement a method for completing self-activation of a mobile device upon powering on the mobile device via a platform of a wireless network.

Reference now is made in detail to the examples illustrated in the accompanying drawings and discussed below. FIG. 1 is a functional block diagram of an exemplary system 200 that supports various mobile communication services and which may implement a method for completing self-activation of a mobile device upon powering on the mobile device via a platform of a wireless network.

The illustrated system 200 services any number of mobile devices, including the illustrated Mobile Device 280. Mobile Device 280 may be a laptop, a personal digital assistant ("PDA"), a smartphone, a tablet PC or another portable device designed to communicate via a wireless network. The mobile device 280 in our example corresponds to a smartphone or tablet itself having network communication capability and a user interface, which in this discussion, may be used in the self-activation procedures. Although not shown for simplicity, the present activation techniques also may be used to activate other types of devices onto the network, for example, to activate mobile broadband devices like Jetpacks or USB dongles that provide service connectivity for other types of data devices (e.g. non-mobile/wireless computers or the like) and to activate an increasing variety of mobile network connected devices (e.g. cameras, e-Readers, etc.) that themselves may lack the hardware or programming to support a browser type user interface over the wireless network.

The illustrated system example includes a mobile communication network 220, in this case, operated in accordance with 4G LTE standards. Mobile network 220 may provide mobile telephone communications as well as Internet data communication services. For example, mobile network 220 may connect to the public switched telephone network (PSTN) 240 (eventually connecting to PSTN device 270) and public packet-switched data communication networks such as the Internet 230. Data communications via mobile network 220 provided for users of devices like 280 may support a variety of services such as communications of text and multimedia messages, e-mail, web browsing, streaming or downloading content, etc. with network connected equipment represented generically by the server 231 in the drawing. Voice communication also may involve transport via the Internet 230 using voice over Internet Protocol (VoIP) technologies. Mobile Device 280 may connect to mobile network 220 through a cellular base station 222, two of which appear in the drawing by way of example.

For convenience only, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB, and the wireless mobile devices are types of user equipment (UE) devices. Packet routing and control functions may be implemented in packet routers and/or associated server platforms in the radio access network (RAN) or in many cases in elements of an IP Multimedia Service (IMS) core network (not shown separately) coupled to some number of 4G RANs, although such routing and control element(s) are generically included in the broad class of devices that may be used to implement the network functionality discussed here.

The carrier that operates the network 220 will also utilize a variety of other systems for related purposes, such as maintenance, accounting and provisioning. In the example, the carrier has another data network, e.g. Intranet 221, that provides data communications for other data systems used by the carrier, and that network 221 has connectivity into the network 220 that provides the actual communications services to the carrier's customers. For purposes of the present discussion, equipment communicating via the network 221 includes an enterprise activation services (EAS) server 228 as well as a number of other systems that will be involved in provisioning and the like in the self-activation process. The other systems for provisioning, etc. are shown collectively at 229 in FIG. 1, although more specific examples are discussed later (e.g. with regard to FIGS. 3 and 4).

The EAS server 228, in the examples, is a server functionality implemented on one or more network connected computers. EAS is, for example, an application programming interface (API) that facilitates the mobile device 280 and the hardware platform that implements the EAS server 228 to exchange messages related to the self-activation process. In general, an API is a programming library that includes specifications for routines, data structures, object classes, and variables. Alternatively, or in addition, an API is a specification of remote calls available to a programmer. Thus, in an example, the EAS API defines a series of messages to be exchanged between mobile device 280 and EAS server 228 (e.g., lookup order request, lookup order response, release order request, and release order response). The EAS API also defines the format of each of these messages. The manufacturer of mobile device 280, the mobile network carrier, and/or a third-party developer, for example, can then develop firmware and/or application(s) that invokes the EAS API on mobile device 280 (e.g. client firmware) and/or EAS server 228 (e.g. server application) to generate a corresponding message and/or receive a corresponding response.

The EAS server 228, for example, supports the self-activation procedure by receiving messages via the EAS API from the mobile device 280 and by sending messages via the EAS API to the mobile device 280. The EAS server 228, in the examples, also contains a client functionality to interact with other elements within the network 220 and/or the network 221 for completing the self-activation process.

For authentication and authorization purposes, the network 220 includes a number of home subscriber servers. A home subscriber server (HSS) is an example of a computer or the like that maintains account or customer related service profile records associated with mobile devices that are allowed access to communication service through the mobile network. Of note for purposes of the present discussion, the HSS operates as a control point for providing instructions to other network elements, based on the profile records, so that the network delivers communications services to the mobile devices in accordance with the respective profile records.

In the network 220 in our example, an HSS is a platform that stores a database of profile records for mobile devices 280 authorized for service through the network 220. An HSS provides data upon request to enable session control elements (not separately shown) to control the flow of sessions through the 4G LTE network 220 for the mobile devices, e.g. to authenticate a particular mobile device and to indicate that the mobile device is or is not authorized to utilize a particular network service. The HSS profile record for a mobile device may include relevant identification information, subscription information and possibly information about the location of the device and/or IP (Internet Protocol) address assignment information. A large network deployment, for serving a substantial number of mobile devices includes a number of actual call processing HSS servers, two of which are shown at 223 in the drawing. Each activated mobile device will have a record stored in one of the databases of the HSS servers 223. The network 220 will not provide service to a mobile device unless the mobile device has a record in an HSS and may even terminate an ongoing session when a record for the mobile device is deleted from an HSS.

During actual processing of a call session, a server configured as a Subscriber Location Function (SLF) identifies which of the HSSs 223 to use for services of a particular mobile device. The example network 220 uses a Diameter Routing Agent (DRA) as the implementation of the SLF function, as shown at 225 in FIG. 1. Each activated mobile device will have an entry in the mapping table(s) of the DRA SLF 225 to point to the one of the HSSs 223 having the service profile record for that device.

As discussed more later, with regard to FIG. 2, the mobile device 280 includes an identity chip or module, referred to here as a subscriber identity module (SIM). A similar module, for example, is sometimes referred to as a Universal Integrated Circuit Card (UICC). The SIM in the as-yet un-activated mobile device 280 is pre-provisioned, but only for restricted service sufficient to enable self-activation.

The network 220 also includes an HSS for self-activation (SA HSS) 224. For a mobile device 280 that is not yet activated, there will not be a record to map service for the SIM for that mobile device 280 to an HSS 223 stored in the DRA SLF 225. However, the DRA SLF 225 is configured to route authentication and authorization related communications for such an un-activated mobile device 280 to the SA HSS 224. Assuming the device 280 has a pre-provisioned SIM, there will be a record for that SIM in the SA HSS 224. Such pre-provisioned SIM record is created in the SA HSS 224 as part of the procedure as between the carrier that operates network 220 and the original equipment vendor that supplies the SIM. The vendor stores minimal data in the SIM, and the carrier's system creates a corresponding record in the SA HSS 224. The pre-provisioned SIM is also listed appropriately in an inventory record in a database, such as eTNI database 292 described in relation to FIG. 2. The record for the mobile device 280 in that SA HSS 224, however, supports only restricted network access for the mobile device. In operation, when the user turns on the as yet un-activated mobile device 280 within the network footprint, a session control element will signal the DRA SLF 225 to identify an HSS, and the DRA SLF 225 will identify the SA HSS 224. The session control element will then query the SA HSS 224 regarding authentication/authorization; and based on the device record in that SA HSS 224, the SA HSS 224 will instruct that session control element to route data sessions from mobile device 280 to the EAS server 228.

The pre-provisioning of SIMs without active subscriber accounts will assure that the device will be able to authenticate and acquire an IP address and in turn be able to reach the EAS server 228. In some situations, however, a SIM may not be pre-provisioned and/or a record for that SIM may not be in the SA HSS 224. In these situations, the mobile device 280 may not be able to reach the EAS server 228 via the network 220. In such a situation, mobile device 280 may establish a connection, for example, with a wireless communication network, such as Wi-Fi 232. Wi-Fi 232 is also connected to the Internet 230 and Wi-Fi 232, for example, provides an IP address to mobile device 280. Hence, in this example, if mobile device 280 is unable to reach the EAS server 228 via the network 220, mobile device 280 may be able to reach the EAS server 228 via Wi-Fi 232 and the Internet 230. Whether connected via network 220 or via Wi-Fi 232 and the Internet 230, mobile device 280 directs traffic to the EAS server 228 based on an address for the EAS server 228 defined by the EAS API stored on the mobile device 280.

During the ensuing first data communication, the EAS server 228 allows equipment of the cellular network provider to obtain sufficient information so that use of a cellular network can be permitted and billed. During later data communications, a cellular network provider permits use of the cellular network 220 and bills for that use accordingly. The subsequent full service data communication is prevented until first data communication has been successfully completed. Use of the words "billed" and "bills" encompass various plans for prepayment for service, postpayment for service, as well as any combination of prepayment and postpayment.

It may help to briefly explain how such a self-activation procedure might appear from the device user's perspective. When an end-user purchases a mobile device 280 equipped with a 4G SIM and turns that device 280 on, while in the 4G LTE footprint of network 220 or connected via Wi-Fi 232, the self-activation process will automatically begin. As outlined above, the network 220 will route communications of the mobile device 280 to the EAS server 228 or the mobile device 280 will reach the EAS server 228 via Wi-Fi 232 and the Internet 230. The mobile device 280, without user interaction, will query the EAS server 228 for any pending order related to mobile device 280. Based on information contained in the query, the EAS server 228 will find any pending order e.g. via queries to one or more other carrier systems. If found, the system 200 then completes the corresponding activation and provisioning of any pending order, as described in further detail below in relation to FIG. 4. The EAS server 228 will then notify mobile device 280 of the results of such activation and provisioning (e.g., success or failure). The mobile device 280 will then display those results to the user. Upon successful completion of activation and provisioning, for example, the mobile device 280 will display "Device Activated" to the user. If unsuccessful, the results will include an error code and a brief description of the error, which will be displayed by mobile device 280.

The self-activation procedure via the EAS server 228 is intended to involve as little user interaction as possible. As such, device identifier(s) and user identifier(s) (e.g. International Mobile Equipment Identity (IMEI), and International Mobile Subscriber Identity (IMSI)) are provided to the EAS server 228 automatically from the user equipment (device 280) that is attempting to self-activate, and passed on to downstream equipment 229 involved in the account activation and related provisioning procedures.

Prior to completion of the self-activation process, the network 220 only allows the mobile device 280 to communication through the network 220 so that device 280 can access the EAS server 228.

In our example, the mobile device 280 has a pre-provisioned SIM with credential(s) sufficient only to enable network access to the EAS server 228. After the self-activation process completes and the user is assigned a full set of network credentials, e.g. including an MDN and/or MS-ISDN, the SIM record in the SA HSS 224 is migrated to the regular call processing HSS 223 and the record is deleted from the SA HSS 224. An entry is added to the mapping table of the DRA SLF 225 to point to the appropriate HSS 223.

Also, the user of the mobile device 280 may be given feedback as to status of the activation process. When the activation process is complete, for example, a confirmation is sent to the user's device by SMS, email address, or both.

Figure 2:
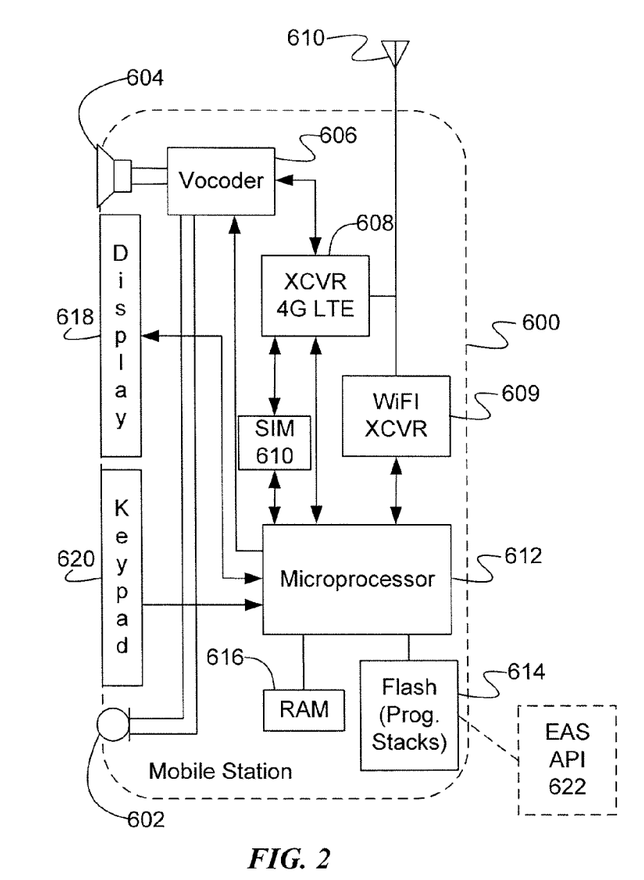
FIG. 2 provides a block diagram illustration of an example of mobile device.

FIG. 2 provides a block diagram illustration of an exemplary mobile device 600, which may be used as the mobile device 280.

Although mobile device 600 may be a smart-phone or a tablet PC or may be incorporated into or connected to provide data communications for another device, such as a portable personal computer, personal digital assistant (PDA), etc., for discussion purposes, the illustration shows mobile device 600 in the form of a handset or feature phone. The handset example of the mobile device 600 functions as a normal digital wireless telephone station. For that function, the mobile device 600 includes a microphone 602 for audio signal input and a speaker 604 for audio signal output. The microphone 602 and speaker 604 connect to voice coding and decoding circuitry (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (Internet protocol) communications.

For digital wireless communications, mobile device 600 also includes at least one of digital transceivers ("XCVR") 608 and 609. Mobile device 600 is a multimode device capable of operations on various technology type networks. The concepts discussed here encompass embodiments of the mobile device 600 utilizing any digital transceivers that conform to current or future developed digital wireless communication standards.

In the example, transceiver 608 is compatible with one or more standards of communication implemented in the public wide area mobile network 220. In particular, transceiver 608 supports 4G LTE wireless communications over airlinks with base stations 222. The same or a different transceiver (not shown) may also support one or more other standards of communication implemented in public mobile networks, such as CDMA, 1xRTT, EvDO, GSM or UMTS, e.g. for use when operating in areas where 4G LTE service may not be available. Transceiver 609 is compatible with one or more standards of communication implemented in wireless local area networks (WLANs), such as one of the WiFi standards and/or WiMAX.

Transceiver 608 provides two-way wireless communication of information, such as vocoded speech samples and/or digital message information, in a selected one of the technology modes. Transceiver 608 also sends and receives a variety of signaling messages in support of the various voice and data services provided via the mobile device 600 and the communication network. Each transceiver 608 connects through radio frequency ("RF") send and receive amplifiers (not separately shown) to an antenna 610.

Transceiver 609 also provides two-way wireless communication of information, such as vocoded speech samples and/or digital message information, in a selected one of the technology modes. Transceiver 609 sends and receives a variety of signaling messages in support of the various voice and data services provided via the mobile device 600 and the communication network. Transceiver 609 connects through RF send and receive amplifiers (not separately shown) to an antenna 610. In the example, transceiver 609 is configured for RF communications in accord with a wireless LAN protocol (a hotspot), such as WiFi. For the network selection function, network communications via Transceiver 609 and antenna 610 may include detection of the available wireless LAN technology types in any given service area and selection of an available network for communications. Mobile device 600 may use transceiver 609 to communicate with a hotspot network, and may use transceiver 608 to communicate with cellular network 220.

The mobile device 600 may utilize a variety of different devices/technologies to implement user interface functions, for output of information to the user and input of information by the user. Many smartphones and tablets, for example, utilize touchscreen displays as (or as a part of) the user interface. For simplicity, however, the example in FIG. 2 utilizes a display and keypad.

Mobile device 600 therefore includes display 618 for displaying messages, menus, call related information dialed by the user, calling party numbers, displaying applications, images, video, and web pages, etc. Displayed information may include responses and/or status provided by the EAS server 228 (e.g. status message regarding progress through self-activation and/or "Device Activated" upon successful activation) during and/or after the self-activation process. Keypad 620 enables dialing digits for voice and/or data calls as well as generating selection inputs, for example, as may be keyed in by the user based on a displayed menu or as a cursor control and selection of a highlighted item on a displayed screen. Display 618 and keypad 620 are the physical elements providing a textual or graphical user interface, in this simple example. User input/output may also be audible, e.g. via the microphone 602 and speaker 604, including during self-activation of the mobile device 600 Various combinations of keypad 620, display 618, microphone 602 and speaker 604 may be used as the physical input output elements of the GUI, for multimedia (e.g. audio and/or video) communications. Other user interface elements may be used, such as a stylus and touch sensitive display screen, as in a PDA or smart phone.

Microprocessor 612 serves as a programmable controller for the mobile device 600, in that it controls all operations of mobile device 600 in accord with programming that it executes, for all normal operations, and for operations involved in automatic self-activation. In the example, mobile device 600 includes flash type program memory 614, for storage of various "software" or "firmware" program routines and mobile configuration settings. The mobile device 600 may also include a non-volatile random access memory (RAM) 616 for a working data processing memory.

Of course, other storage devices or configurations may be added to or substituted for those in the example. In a present implementation, the flash type program memory 614 stores firmware such as a boot routine, device driver software, an operating system, call processing software, EAS client API 622, as described above, and vocoder control software, and any of a wide variety of other applications, such as client browser software and short message service software. The memories 614 and 616 also store various data, such as telephone numbers and server addresses, downloaded data such as multimedia content, and various data input by the user. Programming stored in the flash type program memory 614, sometimes referred to as "firmware," is loaded into and executed by the microprocessor 612 to configure the device to implement various device functions.

The mobile device 600 will store information needed to allow that device to operate over the network 220. Although other secure storage may be used, in the example, the device 600 includes a SIM card 610. The SIM card 610 in this example is a standardized module for secure storage of a variety of different information that may be used in communications with the network 220, for example, data identifying the mobile station to the network (e.g. IMSI, MDN and/or MIN). The SIM may also store policy or operation control information such as preferred roaming lists. The SIM card can also store, for example, a user's private key, a public key, certificate or personal information. The information stored in the SIM card is tamper-resistant and secure.

The SIM card may include an interface circuit for communication with a mobile terminal in which the SIM card is installed, a control circuit, a flash memory, a ROM and a RAM. The flash memory, for example, may provide tamper resistant memory spaces, which can prevent unauthorized access to that memory space of the SIM card. For example, a SIM card may provide separate memory spaces for each application executable on the mobile terminal such that the memory space for one application is isolated and cannot be accessed by another application, by maintaining security domains in memory, as defined by the specification for SIM cards.

Information stored in the SIM card may be utilized for security, authentication or encryption purposes. For example, in addition to network authentication and authorization functions, the information in a SIM may be used for personal identification or for mobile payment. However, for security reasons, the SIM card is accessible only by a trusted server of the operator of the mobile communication service.

The SIM itself is identified by an ICCID. The ICCID includes a number up to 22 digits long including an issuer identification number, individual account identification and a check digit. The IMSI enables an operator of mobile communication network 220 (e.g., a wireless service carrier) to uniquely identify the subscriber on their network. The IMSI is tied to the corresponding telephone number so that a network of the mobile communication operator can connect phone calls with the mobile device that contains the SIM card by using the IMSI.

Figure 3:
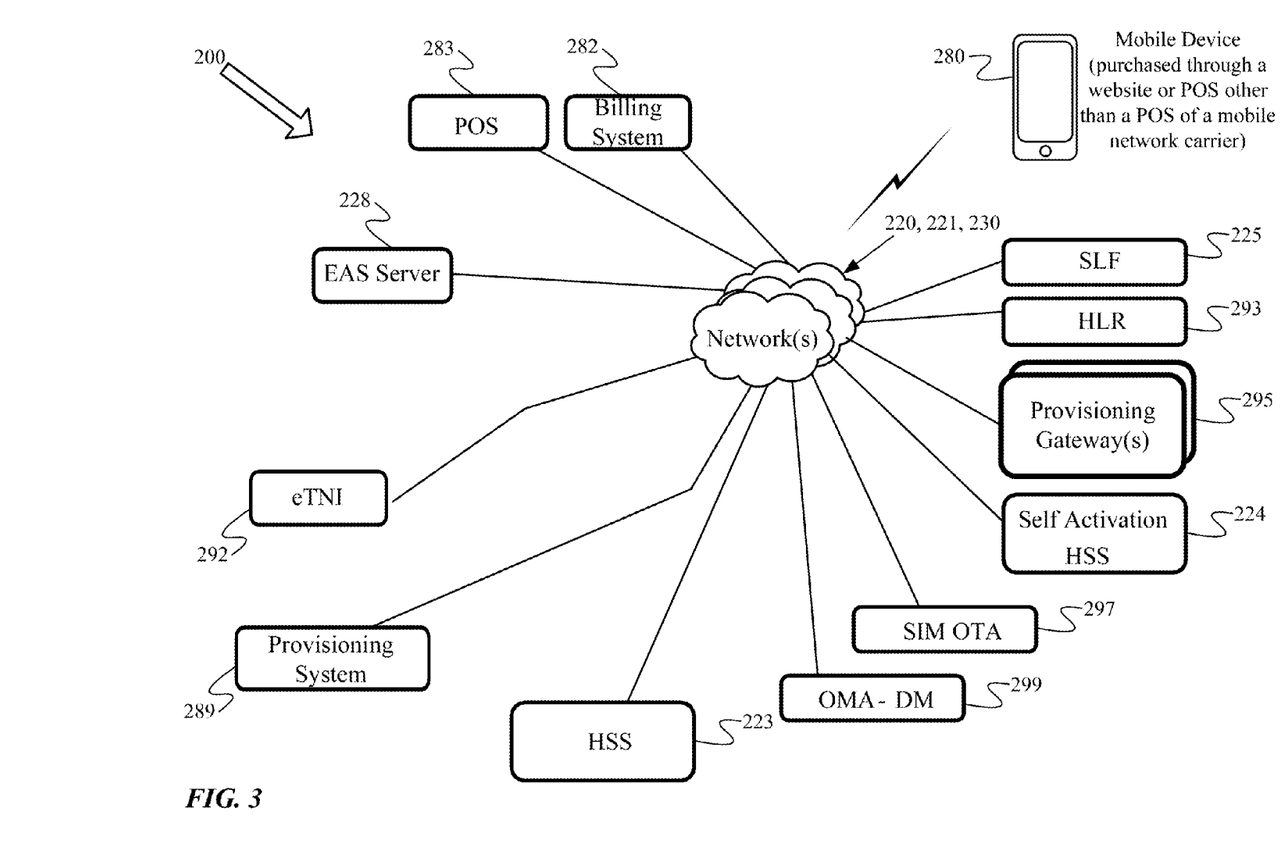
FIG. 3 provides a block diagram of another example of the network but showing a different of the elements that may be involved in the self-activation of mobile device.

FIG. 3 provides a somewhat different block diagram that illustrates the system 200, by way of an example, but showing examples of more elements of the system 200 for allowing mobile device 280 to be activated by a user of the device. The drawing shows the device 280, the networks 220, 221 are shown more generally as clouds (omitted elements such as the base stations), but this drawing depicts more of the carrier equipment/systems that may be involved in specific self-activation procedures discussed in more detail later (e.g. regarding FIG. 4). In that regard, the DRA SLF 225 and the HSSs 223, 224 are shown outside the networks for convenience, to better illustrate their communications with other systems during provisioning for the mobile device 280.

Of note for purposes of discussion of FIG. 3, in addition to the authentication and authorization functions, the records in the DRA SLF 225 and the HSSs 223, 224 are manipulated as part of the provisioning tasks. As outlined above, a record for a pre-provisioned SIM resides in the self-activation HSS 224 prior to activation of the mobile device 280 on the network 220. As part of the provisioning process, upon self-activation, that record is deleted from the self-activation HSS 224 and a full record for the newly activated SIM is added to one of the regular session processing HSSs 223 and may be further populated so as to allow the device 280 full service on the network 220. The provisioning steps will also include a step to add an entry for the mobile device 280 to the mapping table in the DRA SLF 225 to point to the HSS 223 that now stores the record for the SIM of the fully activated mobile device.

Mobile device 280 communicates with the EAS server 228 through the networks 220, 221 as previously described with reference to FIG. 1. In particular, EAS server 228 receives through cellular network 220 a request, in the example, a pending order query, for automatic self-activation of the mobile device 280 from the mobile device 280.

In addition to the elements of the system 200 discussed so far, the drawing shows a billing system 282. The billing system 282 is a system of one or more computers that stores account records for customers of the carrier, including data about the mobile devices activated on each account and the features/service plans applicable to the various mobile devices on the accounts.

Thus, billing system 282 maintains billing information for all mobile devices that attempt to communicate via network 220. The billing system 282 maintains a record of all mobile devices that have prepaid service and the type of prepaid service that is associated with each mobile device. The billing system 282 may maintain information regarding prepay service, postpay service, or both. Thus, if mobile device 280 has prepaid service, billing system 282 maintains information associated with mobile device 280 so that it can be confirmed that mobile device 280 has prepaid service. Along with other data, the information associated with mobile device 280 that is stored by billing system 282 may include mobile device 280's phone number, International Mobile Subscriber Identity (IMSI), International Mobile Station Equipment Identity (IMEI), and/or the unique serial number or identifier (integrated circuit card identifier or ICCID) associated with the subscriber identification module (SIM) card within mobile device 280. For new devices, records are added to the billing system 282 as part of the activation process.

The drawing also shows a point of sale (POS) system 283. At a high level, the POS 283 is a computer system that processes information in support of or in relation to in-store and/or website sales, at store facilities of the carrier and/or stores of other parties with whom the carrier may have a particular contractual arrangement to sell mobile devices for service on the network 220.

eTNI 292 is an enterprise Telephone Number Inventory database that stores information associated with telephone numbers of mobile devices. Thus, for example, the eTNI 292 includes a table that maps IMSI to SIM card ICCID's. The eTNI database 292 also includes a table that is used to assign a telephone number to a SIM card ICCID. For pre-provisioned SIMS, the eTNI database 292 will also list ranges of ICCIDs and IMSIs that manufactures will assign to SIMs for the carrier's customers as "pre-provisioned." At manufacture, the original equipment manufacturer (OEM) will assign ICCIDs and IMSIs from the pre-provisioned ranges to particular SIMs and load such data as needed into the SIMs. The OEM will also send the IMSI and encryption keys associated with the pre-provisioned SIM to the carrier equipment, e.g. to provisioning system 289.

Provisioning system 289 is a provisioning system that is responsible for communicating with other portions of system 200 to provide data to enable activation of the mobile device 280. Provisioning system 289 receives requests to activate mobile device 280, and in response supplies data to other system components, such as provisioning gateway(s) 295 so as to enable service for the mobile device 280 on the network. The provisioning system 289 may also provide notification(s) of status of various provisioning tasks back to the EAS server 228, for example, so that the EAS server 228 can notify the mobile device 280 of progress and/or that activation is complete.

The drawing also shows a number of other elements that may be provisioned for service of the mobile device 280 as part of the self-activation process. The system 200, for example includes a home location register (HLR) 293, for example, for a code division multiple access (CDMA) type legacy radio access network. Although the network 200 is described above as a 4G LTE network, the carrier may also operate a legacy network using CDMA, GSM, etc., e.g. in areas where the carrier has not yet deployed 4G LTE equipment and/or to service legacy mobile devices that do not have 4G LTE capability. The HLR 293 performs authentication and authorization related functions in the CDMA or other legacy network similar to functions of the HSSs 223 discussed above. For those purposes, the HLR 293 stores a customer profile record for each active mobile device. The provisioning for the mobile device 280, as part of the self-activation, may therefore involve adding a customer profile record for the device 280 to the HLR 293 such that mobile device 280 may function with the legacy network.

As outlined earlier, the DRA-SLF 225 facilitates the function of routing signaling traffic for authentication and authorization traffic to appropriate HSSs 223, as mobile devices seek and use packet-based communication services through the mobile communication network 220. In normal operations for activated mobile devices, the HSSs 223 in turn respond to queries so as to enable control of sessions for activated mobile devices through the network 220. The DRA-SLF 225 maintains a list of mobile devices that have been activated with data mapping the mobile device identifiers to the appropriate ones of the HSSs 223. To be fully activated on the network 220, a mobile device must have a record in the mapping table of the DRA-SLF 225 as well as a record in an HSS 223 that indicates policies and service permissions applicable to the particular mobile device. If a telephone number of a mobile device is not stored in DRA-SLF, then this indicates that the mobile device with that telephone number has not been activated. If a request for establishment of an IP session from mobile device 280 is received by DRA-SLF 225, and the phone number associated with the session request is not stored in DRA-SLF 225, then the DRA-SLF 225 knows that the mobile device that made the session request has not been activated. Rather than signaling a failure, however, the DRA-SLF 225 instructs the applicable network element(s) to signal the self-activation HSS 224 to determine authentication and authorization. Assuming that the SIM in the mobile device 280 is pre-provisioned at the self-activation HSS 224, then the HSS 224 causes the network 220 to route the data session of the mobile device 280 to the EAS server 228. The DRA-SLF 225 appears in FIG. 3 so as to show its involvement in provisioning during some steps of various self-activation procedures. Of note, as part of a provisioning for a newly activated mobile device 280, an entry is added to the DRA-SLF 225 for that device identifying the particular one of the HSSs 223 that holds the profile record for that device.

For purposes of discussion of provisioning, the drawing also again shows the two types of HSSs 223 and 224. As outlined above, the HSSs store databases of profile records for mobile devices 280, used for authentication and authorization purposes as the devices utilize service through the network 220. A pre-provisioned SIM (prior to device activation) has a record in the SA HSS 224, which causes the network to restrict communications of the mobile device to communications with the EAS server 228. As part of activation, a record for the newly activated device is created in one of the regular call processing HSSs 223. As noted in the discussion of pre-provisioning, when a SIM is manufactured and ready for use, the OEM will also send the IMSI and encryption keys associated with the SIM to the carrier equipment, e.g. to provisioning system 289. The MTAS 289 will use that data to provision and appropriate record for the SIM into the SA HSS 224. At the end of the provisioning process, provisioning system 289 instructs the SA HSS 224 to delete the record of the pre-provisioned SIM from the service profile record database in the SA HSS 224. The SIM record may be migrated back from the call processing HSS to the SA HSS if the device is de-activated, e.g. as part of a disconnect procedure when service for the device is terminated for some reason.

FIG. 3 also shows a Subscriber Identity Module/Over-the-Air (SIM OTA) 297. In the example, the OTAF or SIM/OTA 297 may be a server connected to the network 220 or 221, to enable the server to communicate with the mobile devices. The SIM OTA server 297 is used to supply provisioning information to the mobile device itself. The mobile device is configured to try to communicate with the SIM OTA 297, for example, whenever the device is booted-up. For an activated device, this may allow the device to replace corrupted data and/or to obtain updates (e.g. a new preferred roaming list) or patches. As part of a self-activation procedure, the provisioning system 289 will provision the SIM OTA server 297 with data that is to be loaded into the mobile device 280. At the end of the activation procedure, the modem or wireless radio of mobile device 280 will be re-booted, which will in part cause the device 280 to communicate with the SIM OTA server 297; and the SIM OTA server 297 will send the appropriate data to the device for installation in the SIM.

In some cases, the provisioning system 289 communicates directly with elements to provide provision data to those elements. In some cases, however, the actual provisioning of network elements is done by a gateway, e.g. a node provided by an equipment vendor to provision data to network elements the carrier obtained from that vendor. As an example, provisioning system 289 may communicate with provisioning gateway(s) 295 during the activation process in order to provision an HSS 223.

The Open Mobile Alliance Device Management (OMA-DM) 299 is a network platform that performs device management such as pushing Access Point Names (APNs) and/or software updates to mobile device 280.

Figure 4:
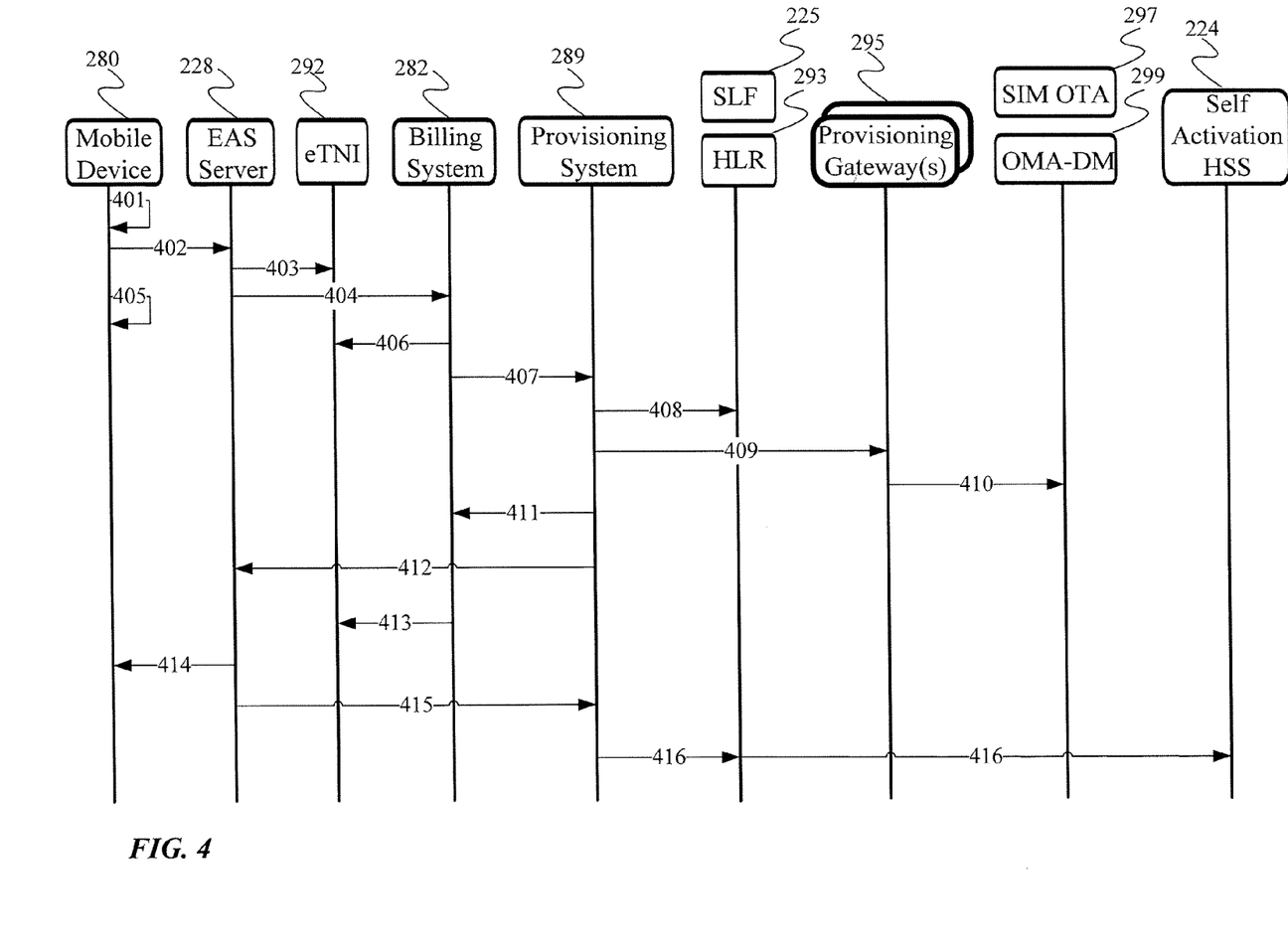
FIG. 4 is a flow diagram of an example of a process for self-activation of a mobile device for service on a network as represented by FIGS. 1 and 3.

FIG. 4 is a flow chart example of a procedure, of the type outlined above, for activating a mobile device for service on the network 220. Elements involved in the process are shown in FIG. 3 and have been discussed in general above. For simplicity, it is assumed that a user has purchased mobile device 280 through a website or a POS other than a POS of the mobile network carrier. As part of the purchase of mobile device 280, the website or POS has created a pending order related to mobile device 280 with the mobile carrier network on behalf of the user.

In this example, at step 401, the user powers on mobile device 280; and, at step 402, mobile device 280 queries the EAS server 228 for any pending order related to mobile device 280. As part of the query, mobile device passes, for example, the IMEI and the IMSI from its SIM to the EAS server 228. The mobile device 280, for example, establishes a connection with the network 220 via base station 222 and queries the EAS server 228 via the network 220. If the mobile device 280 is unable to establish the connection with the network 220 via base station 222, the mobile device 280 establishes a connection with the Internet 230 via Wi-Fi 232 and queries the EAS server 228 via the Internet 230. For example, the EAS API stored on mobile device 280 defines an address for EAS server 228 and mobile device 280 utilizes the defined address to send, either via network 220 or via Wi-Fi 232 and the Internet 230, the query to the EAS server 228.

At step 403, the EAS server 228 queries the eTNI 292 using the IMSI to obtain the SIM's ICCID and validate the status of the SIM's ICCID. In step 404, the EAS server 228 calls POS 283 and/or billing system 282 to release any pending orders. During this time, at step 405, the mobile device displays "Activation in progress".

If the EAS server 228, as part of step 404, does not find any pending orders (e.g. the website or POS failed to properly create a pending order), the self-activation process may be suspended and the user may be prompted with the option to create a new order. The mobile device 280 may be, upon acceptance by the user, redirected to an online self-activation portal (not shown) to create such new order.

At step 406, the billing system 282 revalidates the MDN and ICCID with eTNI 292. Based on this request, eTNI 292 moves the ICCID and MDN to AR (Active Reserved) status. In step 407, the billing system 282 sends corresponding provisioning codes to provisioning system 289, with an indicator that the activation request is self-activation. In response, the provisioning system 289 initiates steps to provision appropriate network elements with data to enable service for the mobile device through the network. For example, at step 408, the provisioning system 289 provisions the DRA-SLF 225 and CDMA HLR 293. The DRA-SLF 225 provisioning will include an IMS group associated with the self-activation HSS.

In step 409, the provisioning system 289 provisions the provisioning gateway(s) 295, if DRA-SLF 225 provisioning is successful. As part of step 409, provisioning gateway(s) 295 place a record for the pre-provisioned SIM in HSS 223. At step 410, provisioning system 289 provisions SIM OTA 297 and OMA-DM 299, if provisioning gateway(s) 295 provisioning is successful. Then, in step 411, the provisioning system 289 sends network element responses to the billing system 282. Upon receiving positive provisioning responses from the required network elements, the billing system 282 moves the record for the effected "line" (MDN) to RS status.

At step 412, the provisioning system 289 sends a message to the EAS server 228, after SIM OTA provisioning, indicating that provisioning is successful. In step 413, the billing system 282 sends a transaction to eTNI 292 requesting that the line be moved to AI (Active in use status).

In step 414, the EAS sever 228 sends back applicable messaging to the mobile device 280. Once messaging is completed to the device, then, in step 415, the EAS server 228 sends a message to provisioning system 289 that device communication is complete.

In step 416, the provisioning system 289 updates the IMS group to the applicable call processing HSS IMS group on DRA-SLF 225 to indicate the applicable HSS 223, and removes the entry on the self-activation HSS 224 in step 417.

At the end of the provisioning in the network, the EAS server 228 sends a notification of successful provisioning to the mobile device 280. Automatically in response to the notification, the mobile device 280 reboots the modem or wireless radio of mobile device 280. The reboot causes the mobile device 280 to obtain data from the SIM OTA 297 to complete its activation. Afterwards, the mobile device 280 is fully activated and operational on the network 220.

As shown by the discussion of self-activation above, a variety of the functions involved are implemented on network elements, carrier operated data equipment and/or mobile devices. Although special purpose devices may be used, some or all of the network elements and/or carrier operated data equipment also may be implemented using one or more hardware platforms intended to represent a general class of data processing device commonly used to run "server" programming so as to implement the self-activation related functions discussed above, albeit with an appropriate network connection for data communication. Although the example of the mobile device discussed in the most detail above included user interface elements, the self-activation technique may also apply to other types of mobile devices (e.g. a jetpack or USP dongle). For such another device activation, the mobile device that is being activated may be connected (at least temporarily) to other user equipment that provides the user interface. Such other user equipment, for example, may be a user terminal type of general purpose computer.

Figures 5, 6:
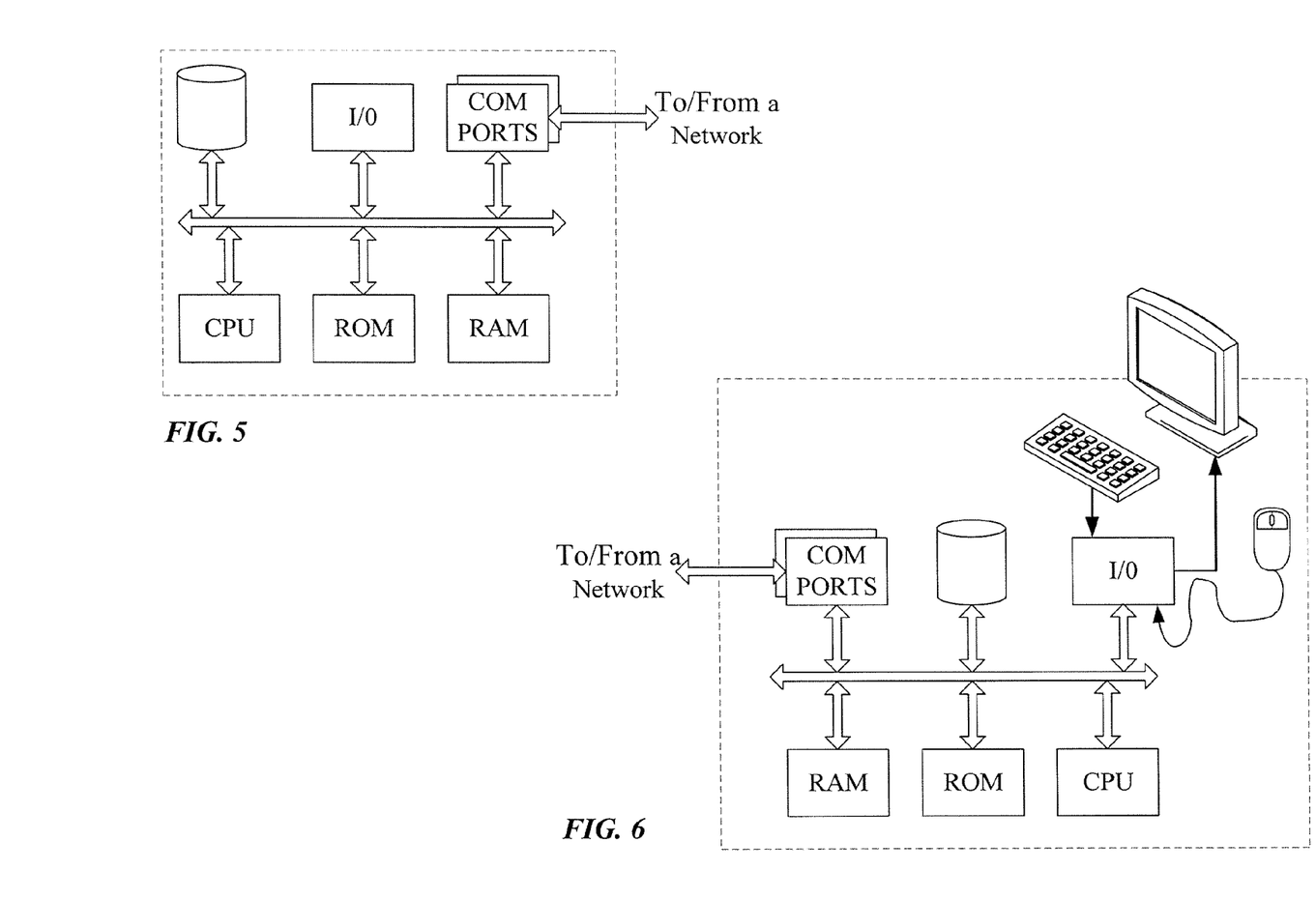
FIG. 5 provides a block diagram of a general purpose computer hardware platform that may be configured as a host or server, for example, to function as any of the server computers shown in FIGS. 1 and 3.
FIG. 6 is a simplified functional block diagram of a personal computer or other work station or terminal device.

FIG. 5 provides a functional block diagram illustration of a general purpose computer hardware platform. More specifically, FIG. 5 illustrates a network or host computer platform, as may typically be used to implement a server, such as EAS server 228 and/or any of the other servers/platforms implementing the EAS server 228 and the activation related functions shown in FIG. 3. FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIGS. 5 and 6 should be self-explanatory from the high-level illustrations.

A server, for example, includes a data communication interface for packet data communication (see FIG. 5). The server also includes a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to the self-activation techniques discussed herein may be downloaded and/or updated from a computer platform, for example, to configure the EAS or other server (e.g. FIG. 1) or from a host computer or the like communicating with the mobile device (e.g. FIG. 2) via the network (e.g. FIG. 1) to download the activation application.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of self-activation and related communications outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory or tangible storage media, more general terms such as computer or machine "readable medium" refer to any medium that participates in providing instructions to a processor for execution.

As shown by the examples discussed above, the technique for self-activation of SIMs begins with a mobile device that contains a pre-provisioned (ICCID) SIM in which a provisioning system has provisioned a corresponding record to the network element, HSS (Home Subscriber Server) for Self-Activation (SA HSS). The pre-provisioned SIM enables the device to connect to the 4G LTE network with restricted access so that the device can connect only to the EAS (Enterprise Activation Services) server to continue the action of self-activation of the mobile device SIM without having the user manually enter device and SIM identification information. The 4G LTE network, in our example, only allows the device access to the EAS server prior to completion of the self-activation process. Upon completion of the self-activation process, the user is assigned network credentials (e.g. MDN and/or MSISDN) to fully activate the user's mobile device, and the SIM record in the SA HSS network element is migrated to the regular call processing HSS network element. However, the SIM record in the SA HSS network element is deleted only after provisioning of a record for that SIM in the regular call processing HSS network element Deleting the SIM record in the SA HSS network element effectively prevents the now fully activated mobile device from being able to return to the EAS server. By delaying that deletion from the SA HSS network element until after successful migration of the SIM record to the regular call processing HSS network element insures that the new mobile device is able to communicate with the EAS server until it is fully activated on the network, and thereby avoiding a problematic inability to communicate if there were no record for the SIM in any HSS (as might otherwise occur due to an activation interruption if the SA HSS record were deleted before addition of the record to the regular HSS).

The self-activation communication flow allows the EAS server to complete communication with the mobile device/ connection manager. This communication will occur after successful provisioning of the SIM card on the mobile carrier's network, and prior to making provisioning modifications that could prevent communication of successful provisioning to the device. The flow also allows for the EAS server to communicate with the device that provisioning is successful, and a reboot of the modem or wireless radio of the device can be performed to complete SIM programming, prior to removing it from the network element, SA HSS.

Customer satisfaction may be improved because the reboot of the modem or wireless radio of the mobile device as the final step in self-activation would result in the expected experience, which is connection to the network and successfully being able to use the mobile device for normal services. The approaches outlined above may also reduce calls into the carrier's customer care center(s) for scenarios where a mobile device does not receive required communication from the EAS server, and the customer has to go into a store or call customer care to resolve the issue.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An activation service system, comprising:
   a first computer platform configured as an enterprise activation services server;
   a second computer platform configured as a provisioning system; and
   a third computer platform configured as a billing server, wherein:
   the enterprise activation services server is configured to:
      receive, from a mobile device, a request for a status of a pending order related to the mobile device, wherein the pending order was placed via a website that is different from a website of a mobile network carrier associated with the mobile device or at a point of sale of the mobile device that is different from a point of sale of the mobile network carrier associated with the mobile device;
      query, in response to the request for the status of the pending order, a telephone number inventory server for:
         an identifier of an identity module included in the mobile device; and
         a status of the identifier;
      search, via the billing server and based on the identifier, for the pending order related to the mobile device;
      upon finding the pending order related to the mobile device, prompt the billing server to:
         release the pending order related to the mobile device; and
         initiate a provisioning process to complete the released pending order,
            wherein the search for the pending order and the prompt to release the pending order each includes a unique indicator indicating self-activation;
      receive, from the provisioning system, a notification related to a status of provisioning the identity module;
      send, to the mobile device upon receipt of the notification, a response to the pending order status request; and
      send, to the provisioning system, a status indication that the response to the request for the status of the pending order has been sent;
   the provisioning system configured to:
      receive, from the billing server, an indication of self-activation related to the identifier;
      provision, in response to the indication of self-activation, at least one of a plurality of network elements within a mobile communications network to support communications via the mobile communications network related to the mobile device;
      send, upon successful provisioning of the at least one of the plurality of network elements, a network element provisioning response to the billing server;
      provision the identity module in the mobile device, in response to the indication of self-activation and successful network element provisioning; and
      send, to the enterprise activation services server, the notification related to the status of provisioning the identity module; and
   the billing server is configured to:
      send, as part of the search for the pending order, an identifier validation request to the telephone number inventory server;
      send, as part of the prompt to release the pending order, the indication of self-activation related to the identifier to the provisioning system;
      receive, from the provisioning system, the network element provisioning response; and
      change, upon receipt of the network element provisioning response, a status related to the mobile device.

2. The system of claim 1, wherein the request for the status of the pending order comprises:
   an international mobile subscriber identity (IMSI) related to the identity module; and
   an international mobile equipment identifier (IMEI) of the mobile device.

3. The system of claim 1, wherein the at least one of the plurality of network elements includes:
   a subscription locator function (SLF);
   a home location register (HLR);
   at least one provisioning gateway configured to forward provisioning information to multiple specific network elements; and
   a call processing home subscriber server (HSS).

4. The system of claim 3, wherein the provisioning system is further configured to:
provision the HLR with a customer profile record related to the mobile device;
provision the SLF with an IP multimedia system (IMS) group associated with the HSS; and
provision, upon successful SLF provisioning, the at least one provisioning gateway to allow the mobile device access via the mobile communications network.

5. The system of claim 4, wherein the enterprise activation services server is further configured to, upon successful provisioning of the identity module, update the IMS group on the SLF to be associated with the call processing HSS.

6. The system of claim 1, wherein the billing server is further configured to send, to the telephone number inventory server, a request to change the status of the identifier to active upon successful provisioning of the at least one of the plurality of network elements.

7. The system of claim 1, wherein the request for the status of the pending order and the response to the request for the status of the pending order are sent via an application programming interface (API) between the mobile device and the enterprise activation services server.

8. The system of claim 1, wherein the response to the request for the status of the pending order prompts the mobile device to reboot a modem of the mobile device.

9. A computer, comprising:
a processor configured to control operations of the computer;
a memory; and
an enterprise activation services server program in the memory, wherein execution of the enterprise activation services server program by the processor of the computer configures the computer to:
receive, from a mobile device, a request for a status of a pending order for a mobile network communication service related to the mobile device, wherein the pending order was placed via a website that is different from a website of a mobile network carrier associated with the mobile device or at a point of sale of the mobile device that is different from a point of sale of the mobile network carrier associated with the mobile device;
query, in response to the request for the status of the pending order, a telephone number inventory server for:
an identifier of an identity module included in the mobile device; and
a status of the identifier;
search, via a remote billing server program and based on the identifier, for the pending order;
upon finding the pending order, prompt the remote billing server program to:
release the pending order; and
initiate a provisioning process to complete the released pending order,
wherein the prompt to release the pending order includes a unique indicator indicating self-activation;
receive, from a remote provisioning system program, a notification related to the status of the provisioning process;
send, to the mobile device, upon receipt of the notification, a response to the request for the status of the pending order; and
send, to the remote provisioning system program, a status indication that the response to the request for the status of the pending order has been sent.

10. The computer of claim 9, wherein the request for the status of the pending order comprises:
an international mobile subscriber identity (IMSI) related to the identity module; and
an international mobile equipment identifier (IMEI) of the mobile device.

11. The computer of claim 9, wherein, when receiving the request for the status of the pending order and sending the response to the request for the status of the pending order, execution of the enterprise activation services server program by the processor of the computer further configures the computer to utilize an application programming interface (API) between the mobile device and the enterprise activation services server program.

12. The computer of claim 9, wherein the response to the request for the status of the pending order prompts the mobile device to reboot a modem of the mobile device.

13. A method comprising:
receiving, from a mobile device, a request for a status of a pending order for a mobile network communication service related to the mobile device, wherein the pending order was placed via a website that is different from a website of a mobile network carrier associated with the mobile device or at a point of sale system associated with the mobile device that is different from a point of sale system of the mobile network carrier associated with the mobile device;
querying, in response to the request for the status of the pending order, a telephone number inventory server for:
an identifier of an identity module included in the mobile device; and
a status of the identifier;
searching, via a remote billing server program and based on the identifier, for the pending order;
upon finding the pending order, prompting the remote billing server program to:
release the pending order; and
initiate a provisioning process to complete the released pending order,
wherein the prompt to release the pending order includes a unique indicator indicating self-activation;
receiving, from a remote provisioning system program, a notification related to the status of the provisioning process;
sending, to the mobile device, upon receipt of the notification, a response to the request for the status of the pending order;
sending, to the remote provisioning system program, a status indication that the response to the request for the status of the pending order has been sent;
receiving, from the remote billing server program, an indication of self-activation related to the identifier;
provisioning, in response to the indication of self-activation, at least one of a plurality of network elements within a mobile communications network to support communications via the mobile communications network; and
sending, upon successful provisioning of the at least one of the plurality of network elements, a network element provisioning response to the remote billing server program.

14. The method of claim 13, wherein the request for the status of the pending order comprises:
   an international mobile subscriber identity (IMSI) related to the identity module; and
   an international mobile equipment identifier (IMEI) of the mobile device.

15. The method of claim 13, wherein, receiving the request for the status of the pending order and sending the response to the request for the status of the pending comprises utilizing an application programming interface (API) between the mobile device and an enterprise activation services server program.

16. The method of claim 13, wherein the response to the request for the status of the pending order prompts the mobile device to reboot a modem of the mobile device.

17. The method of claim 13, wherein the telephone number inventory server includes a table that maps an international mobile subscriber identity (IMSI) to an integrated circuit card identifier associated with a subscriber identification module card.

18. The method of claim 13, further comprising:
   upon finding the pending order, prompting the point of sale system to release the pending order.

19. The activation service system of claim 1, wherein the telephone number inventory server includes a table that maps an international mobile subscriber identity (IMSI) to an integrated circuit card identifier associated with a subscriber identification module card.

20. The computer of claim 9, wherein the telephone number inventory server includes a table that maps an international mobile subscriber identity (IMSI) to an integrated circuit card identifier associated with a subscriber identification module card.

* * * * *